(12) United States Patent
Furuhjelm

(10) Patent No.: US 9,785,350 B2
(45) Date of Patent: Oct. 10, 2017

(54) DATA STORAGE DEVICE HAVING A VIRTUAL MACHINE

(71) Applicant: Seagate Technology LLC, Cupertino, CA (US)

(72) Inventor: Martin R Furuhjelm, Auburn, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 301 days.

(21) Appl. No.: 13/773,337

(22) Filed: Feb. 21, 2013

(65) Prior Publication Data

US 2016/0011777 A1   Jan. 14, 2016

(51) Int. Cl.
*G06F 3/06*    (2006.01)
*G06F 9/455*   (2006.01)

(52) U.S. Cl.
CPC ............ *G06F 3/061* (2013.01); *G06F 3/0607* (2013.01); *G06F 3/0659* (2013.01); *G06F 3/0661* (2013.01); *G06F 3/0676* (2013.01); *G06F 9/455* (2013.01)

(58) Field of Classification Search
CPC .......... G06F 9/4443; G06F 8/38; G06F 9/541; G06F 21/53
See application file for complete search history.

(56) References Cited

U.S. PATENT DOCUMENTS

| | | | |
|---|---|---|---|
| 7,725,614 B2 | 5/2010 | Jogand-Coulomb | |
| 7,886,115 B2 | 2/2011 | Sanvido | |
| 8,166,244 B2 | 4/2012 | Fruchter | |
| 2002/0016827 A1 | 2/2002 | McCabe | |
| 2002/0052727 A1 | 5/2002 | Bond | |
| 2004/0138868 A1 | 7/2004 | Kuznetsov | |
| 2004/0168030 A1* | 8/2004 | Traversat et al. | 711/133 |
| 2005/0268308 A1* | 12/2005 | Tang et al. | 719/328 |
| 2006/0143316 A1 | 6/2006 | Mills et al. | |
| 2007/0207792 A1* | 9/2007 | Loving | 455/418 |

(Continued)

OTHER PUBLICATIONS

Notice on the first office action, CN 201410058457.8, Jun. 29, 2016, 3 pages.

(Continued)

*Primary Examiner* — Tuan Dao
(74) *Attorney, Agent, or Firm* — Cesari & Reed, LLP; Kirk A. Cesari; Christian W. Best

(57) ABSTRACT

Apparatuses, systems, and methods for implementing a virtual machine on a data storage device are disclosed. In one embodiment, a device may comprise a communication interface responsive to a host, a processor, and a housing including the communication interface and the processor such that the device is removable from the host. The processor may be configured to receive a command from the host via the communication interface, process the command using a platform-independent program interface that is not dependent on the architecture of the device, and return results of the command to the host via the communication interface. In another embodiment, a method may comprise receiving at a data storage device a command from a host device, processing the command at the data storage device using a platform-independent program interface, and returning the results of the command from the data storage device to the host.

15 Claims, 3 Drawing Sheets

(56) References Cited

U.S. PATENT DOCUMENTS

| | | | |
|---|---|---|---|
| 2007/0239876 A1* | 10/2007 | Chandra et al. | 709/228 |
| 2008/0162817 A1 | 7/2008 | Batterywala | |
| 2008/0243947 A1 | 10/2008 | Kaneda | |
| 2009/0177781 A1* | 7/2009 | Mosek | 709/228 |
| 2009/0282101 A1* | 11/2009 | Lim et al. | 709/203 |
| 2010/0199268 A1* | 8/2010 | Frost | 717/139 |
| 2011/0113428 A1* | 5/2011 | Nelson et al. | 718/1 |
| 2011/0179414 A1* | 7/2011 | Goggin | G06F 3/061 718/1 |
| 2011/0191834 A1* | 8/2011 | Singh | G06F 17/00 726/6 |
| 2011/0202743 A1* | 8/2011 | Kaneda | 711/170 |
| 2012/0054739 A1* | 3/2012 | Arakawa et al. | 718/1 |
| 2012/0260144 A1* | 10/2012 | Varanasi et al. | 714/755 |
| 2012/0272241 A1* | 10/2012 | Nonaka et al. | 718/1 |
| 2013/0054910 A1* | 2/2013 | Vaghani | G06F 3/061 711/162 |

OTHER PUBLICATIONS

Search Report, 201410058457.8, People's republic of China, 11 pages.

\* cited by examiner

DATA STORAGE DEVICE HAVING A VIRTUAL MACHINE

BACKGROUND

The present disclosure is generally related to virtual machines and device-independent programming interfaces on data storage devices.

SUMMARY

Generally, an apparatus data storage device is presented that includes a virtual machine configured to allow a device-independent programming interface. In one example, a device may include a communication interface responsive to a host, a processor, and a housing including the communication interface and the processor such that the device is removable from the host. The processor can be configured to receive a command from the host via the communication interface, process the command using a platform-independent program interface that is not dependent on the architecture of the device, and return results of the command to the host via the communication interface.

In another example, a system may comprise a host as well as a data storage device including a communication interface responsive to the host, a processor, and a housing including the interface and the processor such that the data storage device is removable from the host. The processor can be configured to receive a command from the host via the communication interface, process the command using a virtual machine that is not dependent on structural architecture of the data storage device, and return results of the command to the host via the communication interface.

In yet another example, a method may comprise receiving at a data storage device a command from a host device, processing the command at the data storage device using a platform-independent program interface that is not dependent on the architecture of the data storage device, and returning the results of the command from the data storage device to the host.

DETAILED DESCRIPTION

In the following detailed description of the embodiments, reference is made to the accompanying drawings which form a part hereof, and in which are shown by way of illustration of specific embodiments. It is to be understood that other embodiments may be utilized and changes may be made without departing from the scope of the present disclosure.

Figure 1:
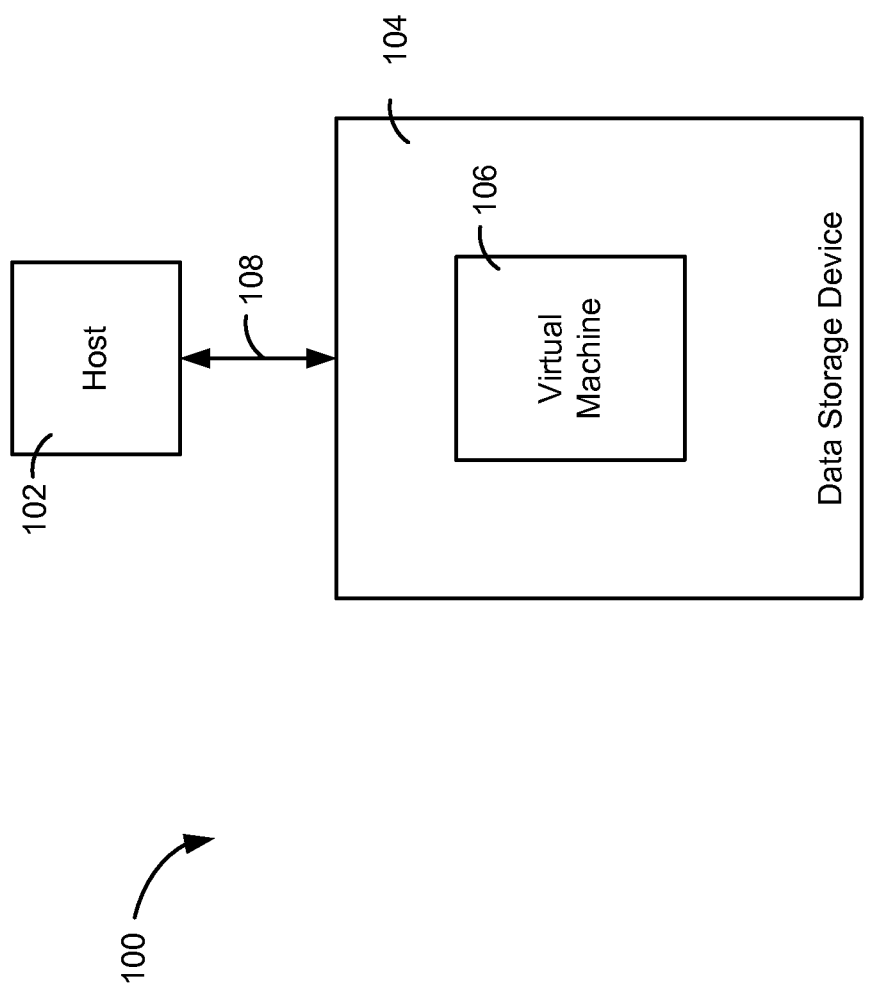
FIG. 1 is a diagram of an illustrative embodiment of a data storage device having a virtual machine.

Referring to FIG. 1, an embodiment of a computer system is shown and generally designated 100. The system 100 may include a host 102, a data storage device (DSD) 104, and an interface 108. The host 102 may also be referred to as the host system or host computer. The host 102 can be a desktop computer, a laptop computer, a server, a personal digital assistant (PDA), a telephone, a music player, another electronic device, or any combination thereof. The DSD 104 may be a disc drive, a solid-state drive, a hybrid drive, a USB flash drive, or any other kind of storage device. The DSD 104 may be separately removable from the host 102 and may include a casing, housing, or other physical enclosure encompassing the components of the DSD 104. The interface 108 can be a communication medium between the host 102 and the DSD 104, and may include a connector allowing for the attachment or detachment of the DSD 104 from the host 102. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others.

The data storage device 104 can include a virtual machine programming interface (VM) 106. A virtual machine may be a platform-independent programming environment that provides a level of abstraction that can obscure details of the underlying hardware or operating system (OS), and allows a program to be designed for the VM rather than for the underlying computer platform on which the VM is running. A platform can refer to the hardware architecture and software framework of a device, such as a computer's physical components and operating system. By being platform-independent, virtual machine environments can be designed to present the same program interface regardless of a system's architecture or operating system. In other words, a computer application can be designed to interface with and execute on a particular virtual machine without requiring details of the system on which it will be running.

In some embodiments, a virtual machine can emulate the platform characteristics of another device, even if the actual device running the VM 106 does not share such characteristics. That is, an application designed to operate with a certain platform can run on a VM emulating that platform, with the VM running on a device having a different platform. This can still be platform-independent in that a device can still run an application designed for a different platform by using the VM 106.

In some embodiments, virtual machines may be "process" virtual machines that provide a program environment to run a process, or "system" virtual machines that can emulate or obscure hardware architecture, such as a hardware abstraction layer (HAL).

The VM 106 may be any type of virtual machine environment, including Java virtual machines, Dalvik, Microsoft's .NET Framework running the Common Language Runtime, and Parrot virtual machines, among others. Applications may be designed to run in the VM environment 106 without the need to redesign the applications to take into account specific physical components (such as the processor), operating systems, etc. of a DSD 104. This can allow the use of DSDs as processing devices for applications without the need to redesign the applications based on the device manufacturer or architecture.

In one example, there are two devices; one is a mobile phone running the Windows 8 operating system, and the other is a computer server running the Linux operating system, and both devices have a Java virtual machine. An application designed to run on the Java VM could run on both devices, despite the differences in architecture and operating system, without any changes to the application itself.

Virtual Machine 106 may be implemented to run on a processor, controller, digital signal processor, reduced instruction set computer (RISC), application specific integrated circuit (ASIC), field-programmable gate array (FPGA), system-on-a-chip, or any engine having sufficient computational power. VM 106 may be implemented as software running on the DSD 104, or as a specifically configured circuit. In some embodiments, the DSD 104 may run an operating system, with the VM 106 running within the OS environment while still providing an OS-independent program interface.

Figure 2:
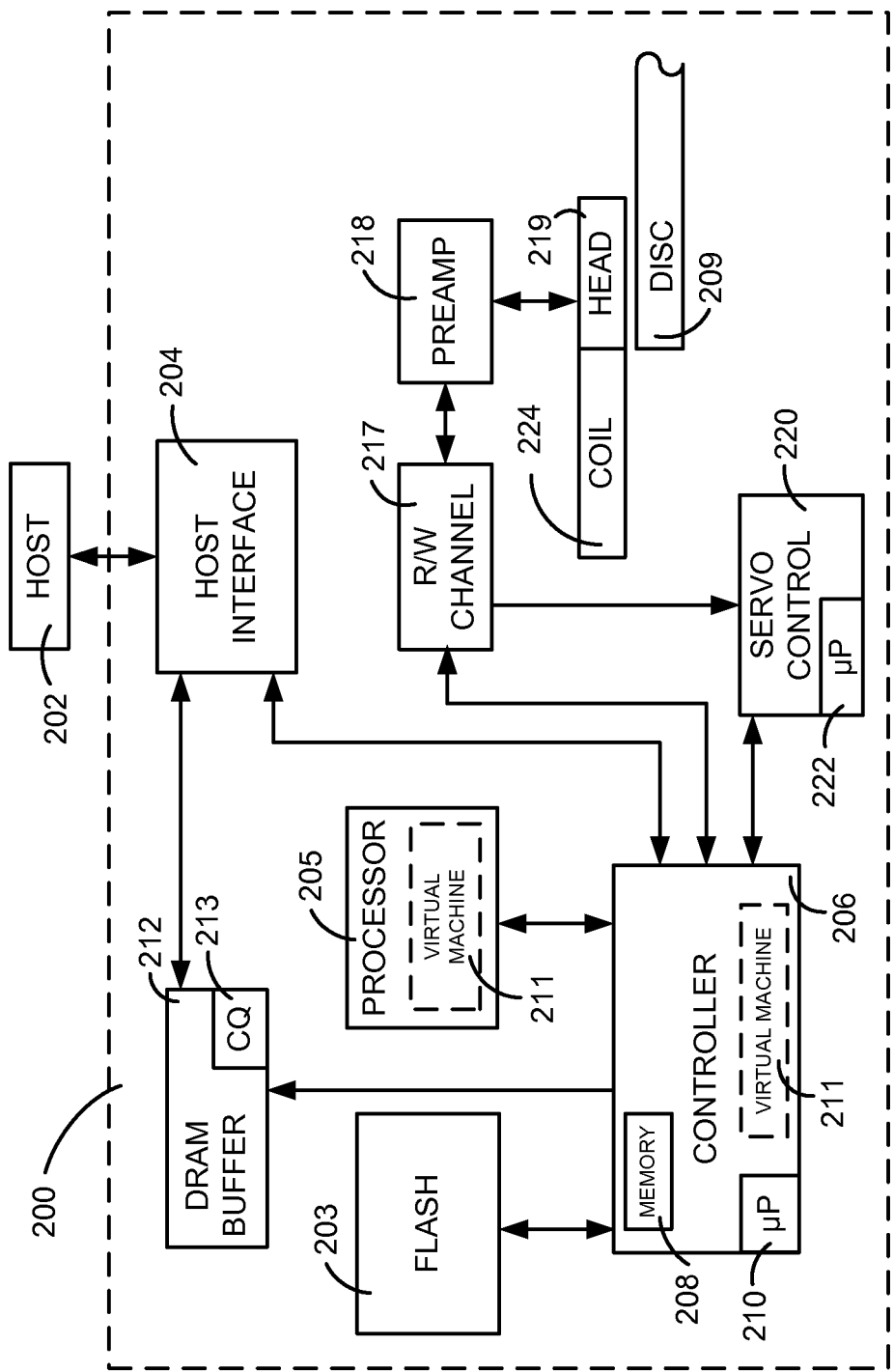
FIG. 2 is a diagrams of an another illustrative embodiment of a data storage device having a virtual machine.

Referring to FIG. 2, a particular embodiment of a data storage device having a virtual machine is shown and generally designated 200. Specifically, FIG. 2 provides a functional block diagram of a disc drive data storage device (DSD) 200. The DSD 200 may be a data storage device such as the device 104 shown in FIG. 1. The data storage device 200 can communicate with a host device 202 (such as the host system 102 shown in FIG. 1) via a hardware or firmware-based interface circuit 204 that may include a connector (not shown) that allows the DSD 200 to be physically removed from the host 202. In some embodiments, the DSD 200 may communicate with the host 202 through the interface 204 over wired or wireless communication. The buffer 212 can temporarily store data during read and write operations or virtual machine processing, and can include a command queue (CQ) 213 where multiple pending operations can be temporarily stored pending execution. A nonvolatile solid state memory 203, such as Flash memory, can be included for additional cache or buffer memory, or to provide additional data storage for the DSD 200. A DSD 200 containing multiple types of nonvolatile storage mediums, such as a disc 209 and Flash 203, may be a hybrid storage device.

The DSD 200 can include a programmable controller 206 with associated memory 208 and processor 210. The controller 206 may implement a virtual machine environment 211 as a platform-independent program interface. In some embodiments, the DSD 200 may include a processor 205, and the virtual machine 211 may be implemented as computer instructions running on the processor 205, or as a FPGA, ASIC, or the like.

Further, FIG. 2 shows the DSD 200 can include a read-write (R/W) channel 217, which can encode data during write operations and reconstruct user data retrieved from disc(s) 209 during read operations. A preamplifier circuit (preamp) 218 can apply write currents to the head(s) 219 and provides pre-amplification of read-back signals. A servo control circuit 220 may use servo data to provide the appropriate current to the coil 224 to position the head(s) 219. The controller 206 can communicate with a processor 222 to move the head(s) 219 to the desired locations on the disc(s) 209 during execution of various pending commands in the command queue 213.

In an example embodiment, a command is received at the DSD 200 from the host 202 over the interface 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The DSD 200 may be configured to determine the nature of the command and behave accordingly. For example, the command may be a data storage command requesting the storage or retrieval of data at the DSD 200. The command may also be a task or application to be run on the virtual machine 211, and may also include data associated with the task or application. In some embodiments, data storage commands may comprise commands included in a standard instruction set of the communication interface, while VM tasks may be non-interface-standard commands.

For example, a sample VM command from the host may consist of either code to be executed by the VM, or a pointer to code stored on the device to be executed by the VM. For example, the VM command can include data that is Java Byte Code that when received by the DSD is directly interpreted by a Java VM within the DSD. The host may also first issue a "standard" write data command to write data to one or more blocks on the storage device, and then issue a VM command that instructs the DSD to load one or more blocks from the storage device and execute code stored there. Furthermore, since a VM can implement a storage space on the storage device, the host command could refer to data by VM file names instead of block numbers.

In an example implementation of a VM using a standard interface (such as SATA or SAS), the implementation of VM-related commands may simply be an extension of the command-set. For example, the SCSI command set used in SAS is defined by the T10 committee, and includes (for Block devices such as DSDs) the SBC-3 standard that defines commands for reading and writing blocks. The commands can be transmitted to the device using CDB's (Command Descriptor Blocks). For example, the "Read" command of the SCSI command set is a sequence of 6 bytes, where the first byte is the command code (for read this byte is the value "6"), the second, third and fourth byte are the Logical Block Address, the fifth byte the Transfer Length and the final byte is "Control". In a similar way the "Write," "Format Unit", and other commands are defined in the SCSI command set. Thus, an example way to implement VM commands would be to define a new command using a new value for the command byte (there are 256 possibilities in a byte), and define how the command works accordingly.

In an example embodiment, a VM may be defined using SCSI. When a host connects to a SCSI device it may use an SCSI inquiry command, which has its own value of 12 h, to identify the connected device. The device may then respond with 00 if it is a direct access block device. There are multiple subclasses of the direct access block device type, and a new type could be added to define a "Direct Access Block Device with Virtual Machine Capabilities" type, which may then implement a set of commands necessary for the VM operation in the device. The fact that the host uses a particular value for the command byte in the CDB would let the storage device recognize the type of command.

Another example implementation would be through an Ethernet interface and the TCP/IP protocol where the host, through a discovery mechanism (such as broadcast, or a host defined list of known VM devices), would know the IP address of the device implementing the VM, and could then send packets directly to a TCP/IP port connected to the VM inside the device.

If the command is a read or write command, the controller 206 may direct the retrieval or storage of the associated data at the disc 209, the Flash 203, or other memory. After completion, the DSD 200 may return the requested data or return a notification that the data has been stored.

If the command comprises a task for implementation on the VM 211, an instance of the VM 211 may be created, or the task may be sent to an instance of the VM 211 that is already running. The VM 211 may be implemented on the controller 206, a separate processor 205, or other computational component. The task or application may be in the form of code to be executed by the VM 211, or instructions to implement a given function of the VM 211. The command may include a set of data in addition to the task, and the task may be to perform an operation on the data. For example, the task may be an equation to perform on a provided data set. In some embodiments, the command may direct that the VM 211 perform an operation on specified data stored on the DSD 200, for example by providing a range of logical block addresses (LBAs).

In one embodiment, large data sets may be stored on the DSD 200, and the task may be to compare the stored data sets to a data set provided by the host and return the closest matches. In another embodiment, the task may be an equation to perform on each data set and return the results to the host. Another embodiment may involve sorting stored data according to criteria provided by the host 202. In some embodiments, the task may involve storing the results on the DSD 200, and returning the address of the stored results to the host 202, rather than returning the results themselves to the host.

Results returned to the host may differ depending on whether the command received from the host was a read or write command, or a VM task. For example, after a read command, the DSD 200 may return the requested stored data, and after a write command the DSD 200 may return a write complete response. In an embodiment where the command was a VM task, the returned results may be the results of a calculation or function performed on the VM 211, a storage address of the results of the task or computation, or other non-interface standard results. For example, data returned in response to a VM command may not include a write complete response or data stored on the DSD 200 prior to receiving the command, but instead include data newly produced in response to the command.

Performing the tasks or algorithms within the VM 211 allows for fast processing at the DSD 200 without a need to send large quantities of data over the interface 204 to the host 202. Thus, any operation that can take advantage of being executed in close proximity to large quantities of data may benefit from a VM implemented on a DSD, such as search functions performed on large data sets where only positive matches may be needed at the host.

In some embodiments, the task sent to the DSD 200 comprises a sub-process of a process being performed by the host 202. For example, a program running on the host 202 may include several process threads, a subset of which can be sent to the DSD 200 for processing. In another embodiment, the host 202 may be connected to a plurality of data storage devices with virtual machines, or multiple DSDs with VMs can otherwise be connected in a network. The VM 211 on each DSD may be instructed to perform a sub-process of a larger process that requires many calculations or large quantities of data. For example, a large quantity of data that must be processed may be stored across multiple data storage devices, and each DSD is instructed to process its respective stored data. Such a system would improve data processing time by distributing the computational workload, and reducing delays by performing the processing on the drive where the data is stored, rather than sending large quantities of data across data busses or interfaces which may bottleneck the processing.

For example, a database might contain 1,000 TeraBytes of data managed by a server connected to 1,000 drives with a capacity of 1 TeraByte each. If a search was to be performed by the server, it may require sending the 1,000 TB of data sequentially from one drive at a time to the server, for example at 100 MB/s. Performing the search in this manner may take days to complete. If each drive had a VM capable of performing a search function on its own respective data, the search may be finished in a matter of hours.

On addition, functions may be more complex than searches. For example, a store chain could have databases of sales records and supply information distributed across storage devices with VMs, which could be accessed to provide up-to-date price estimates based on supply, demand, and previous sales history. Such calculations may be prohibitively slow if the data must be transferred via limited bandwidth and processed by a central server. Similar other applications involving "big data" of large amounts of data stored across a plurality of drives are possible. For example, using internet access history and preferences of users and their peer networks to select appropriate advertising, friend recommendations, music selections, etc.

The VM could also implement an NAS—Network Attached Storage Device—where storage is offered to other devices for backup, media storage, thin provisioning, data de-duplication, and redundancy, with the added benefit that the code implementation would be transportable across device vendors and future technology.

Figure 3:
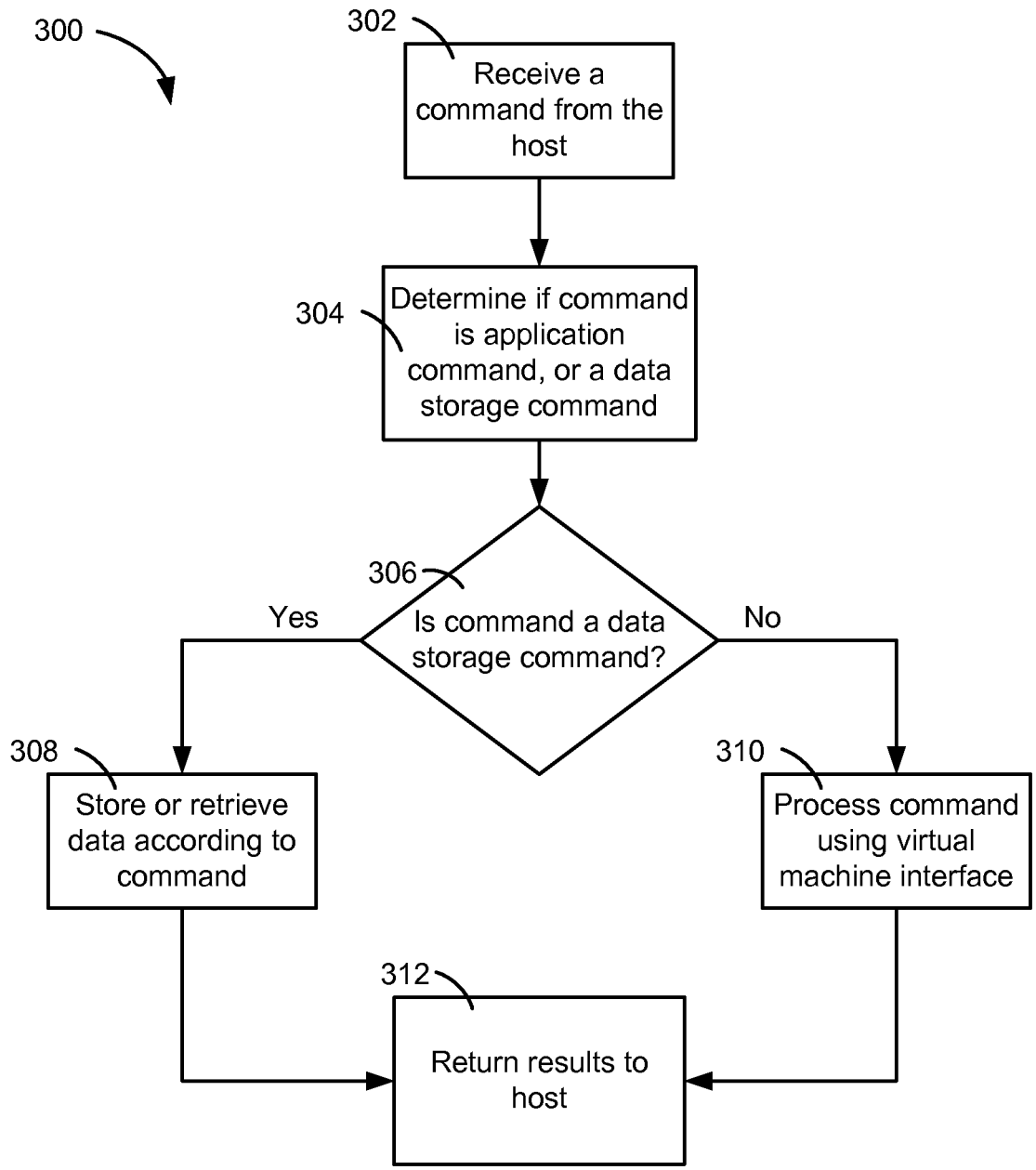
FIG. 3 is a flowchart of an illustrative embodiment of a method for implementing a data storage device having a virtual machine.

Referring to FIG. 3, a flowchart of an illustrative embodiment of a method 300 for implementing a virtual machine on a data storage device is shown. The method 300 can include receiving a command from a host, at 302. The method 300 may involve determining if the command is an application command for implementation by a virtual machine running on the data storage device, or a data storage command such as a data read or write command, at 304. If a determination is made that the command is a data storage command, at 306, the method may involve storing the associated data to the data storage device or retrieving data from the data storage device, at 308.

If a determination is made that the command is not a data storage command, at 306, the command may be an application command executed on the VM, at 310. The application command may be in the form of computer-executable code, instructions, or other directions designating the task to be performed on the VM. For example, the application command may comprise a set of mathematical functions to be performed on a data set. The application command may also include the data on which to perform the task or operation, or it may indicate addresses in which such data is stored on the data storage device. The application command may also direct whether the results of the task are to be returned to the host, stored to the data storage device, or both. If the results are to be stored on the data storage device, a notification that the task was completed or failed to complete, or an address at which the results were stored, may be returned to the host, at 312.

After completion of the data storage command at 308, or the application command at 310, the appropriate results or data may be returned to the host, at 312.

In accordance with various embodiments, the methods described herein may be implemented as one or more software programs running on a computer processor or controller, such as the controller 206. Dedicated hardware implementations including, but not limited to, application specific integrated circuits, programmable logic arrays, and other hardware devices can likewise be constructed to implement the methods described herein. Further, the methods described herein may be implemented as a computer readable medium including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
   a removable data storage drive, including:
   a communication interface responsive to a host and configured to receive a command associated with user data, the command indicating code to be executed by a virtual machine;
   a virtual machine including a platform-independent programming interface of the data storage drive that is not dependent on the architecture of the data storage drive;
   a processor configured to:
   process the command via the virtual machine to produce a computed result comprising newly produced data that is not a write command response and is not previously stored data;
   provide the computed result of the command to the host via the communication interface; and
   a housing including the communication interface, the processor, and a physical connector configured to allow the data storage device to be physically connected and physically disconnected from the host.

2. The device of claim 1, the data storage drive further comprising a data storage medium connected to the housing.

3. The device of claim 2, further comprising the processor configured to: determine if the command is an application command or a data storage command, an
   application command includes an operation to be performed by the virtual machine to produce the computed result, and a data storage command includes a read command or a write command;
   process the command using the virtual machine when the command is an application command; and
   store data to or retrieve data from the data storage drive when the command is a data storage command.

4. The device of claim 2, further comprising processing the command via the virtual machine includes:
   retrieving the user data associated with the command from the data storage medium; and
   processing the user data according to the command.

5. The device of claim 1, further comprising the command includes computer code and instructions to execute the included computer code using the platform-independent program interface.

6. The device of claim 1, further comprising:
   the command includes an equation to perform with one or more data sets stored at the removable data storage drive;
   the processor further configured to:
   retrieve the one or more data sets; and
   calculate the computed result by applying the equation to the one or more data sets.

7. The device of claim 1, further comprising the platform-independent program interface includes computer-readable instructions running on the processor.

8. The device of claim 1, further comprising:
   the command includes data to be processed and instructions on how to process the data;
   and the processor is further configured to process the command using the platform-independent program interface according to the instructions.

9. The device of claim 1, further comprising the command includes instructions to perform a subprocess of a process running on the host to distribute a computational workload.

10. The device of claim 1, further comprising the processor configured to:
    receive a device inquiry from the host; and
    provide a response to the device inquiry identifying the removable data storage drive as a device with virtual machine capabilities.

11. A system comprising:
    a host;
    a data storage drive configured to store user data thereto, including:
    a communication interface responsive to the host;
    a processor configured to:
    receive a command from the host via the communication interface; process the command using a virtual machine of the data storage drive, the virtual machine not being dependent on structural architecture of the data storage drive;
    return results of the command to the host via the communication interface; and
    a housing including the interface and the processor such that the data storage drive is removable from the host;
    a data storage medium connected to the housing;
    the processor further configured to:
    determine if the command is an application command or a data storage command, an application command includes a command designating an operation to be performed by the virtual machine, and a data storage command includes a read command or a write command;
    process the command using the virtual machine when the command is an application command; and
    store data to the data storage medium or retrieve data from the data storage medium when the command is a data storage command.

12. The system of claim 11, further comprising processing the command using the virtual machine includes:
    retrieving data associated with the command from the data storage medium; and
    performing processing operations on the data according to the command.

13. A method comprising:
    receiving a command from a host device at a data storage drive configured to store user data thereto, and that is removable from the host device;
    processing the command at the data storage drive device using a platform-independent program interface that is not dependent on structural and operating system architecture of the data storage drive, the processing producing results including new data that is not a write command response or previously stored data; and returning the results of the command from the data storage drive to the host.

14. The method of claim 13 further comprising:

processing the command at the data storage drive using the platform-independent program interface includes:

retrieving data associated with the command from the data storage drive; and processing the data according to the command.

15. The method of claim 13 further comprising the command includes instructions for the data storage drive to perform a subprocess of a process running on the host to distribute a computational workload.

* * * * *